(12) United States Patent
Kanner et al.

(10) Patent No.: US 10,332,708 B2
(45) Date of Patent: Jun. 25, 2019

(54) SEAMLESS SWITCHOVER SYSTEM AND METHOD

(71) Applicant: Thales Canada Inc, Toronto, Ontario (CA)

(72) Inventors: Abe Kanner, Toronto (CA); Mihai Lungu, Toronto (CA); Janice Zhao, Toronto (CA)

(73) Assignee: THALES CANADA INC, Toronto, Ontario (CA)

( * ) Notice: Subject to any disclaimer, the term of this patent is extended or adjusted under 35 U.S.C. 154(b) by 291 days.

(21) Appl. No.: 15/355,113

(22) Filed: Nov. 18, 2016

(65) Prior Publication Data
US 2017/0169976 A1    Jun. 15, 2017

Related U.S. Application Data

(60) Provisional application No. 62/264,906, filed on Dec. 9, 2015.

(51) Int. Cl.
| | |
|---|---|
| B60T 13/66 | (2006.01) |
| H01H 47/00 | (2006.01) |
| B60M 3/04 | (2006.01) |
| B60T 7/12 | (2006.01) |
| B61L 7/06 | (2006.01) |
| B61L 23/00 | (2006.01) |
| G05B 15/02 | (2006.01) |
| B60T 7/18 | (2006.01) |
| B61L 15/00 | (2006.01) |

(Continued)

(52) U.S. Cl.
CPC ............ *H01H 47/002* (2013.01); *B60M 3/04* (2013.01); *B60T 7/12* (2013.01); *B60T 7/18* (2013.01); *B60T 13/665* (2013.01); *B60T 17/228* (2013.01); *B61L 7/06* (2013.01); *B61L 15/0036* (2013.01); *B61L 15/0063* (2013.01); *B61L 23/005* (2013.01); *G05B 15/02* (2013.01); *H02J 3/006* (2013.01); *B61L 15/0081* (2013.01)

(58) Field of Classification Search
CPC .... B60T 13/665; B61L 23/005; H01H 47/002
See application file for complete search history.

(56) References Cited

U.S. PATENT DOCUMENTS

| | | |
|---|---|---|
| 5,487,149 A | 1/1996 | Sung |
| 5,689,398 A | 11/1997 | Miller et al. |
| 5,786,996 A | 7/1998 | Vitkus et al. |

(Continued)

FOREIGN PATENT DOCUMENTS

| | | |
|---|---|---|
| WO | 2014117940 | 8/2014 |
| WO | 2014161909 | 10/2014 |

*Primary Examiner* — Thomas L Dickey
(74) *Attorney, Agent, or Firm* — Hauptman Ham, LLP

(57) ABSTRACT

A system and method provide seamless control switchover through an input coupled to a power line and a safety apparatus that actuates if the input remains de-energized for a first time interval. Each of a plurality of subsystems has a control unit that controls a power source to energize the power line and is capable of transitioning between master and slave states. A first switch or second and third switches in series couple the power source to the power line. The first switch is closed during master state operation. The second switch is closed during slave operation and the third switch is open if any subsystem control unit is in master state. The system is configured to open or close the first switch, the second switch, or the third switch responsive to a transition of a control unit to or from master state within the first time interval.

20 Claims, 10 Drawing Sheets

(51) Int. Cl.
*B60T 17/22* (2006.01)
*H02J 3/00* (2006.01)

(56) References Cited

U.S. PATENT DOCUMENTS

| | | |
|---|---|---|
| 6,591,150 B1 | 7/2003 | Shirota |
| 6,820,946 B2 | 11/2004 | Salamat et al. |
| 7,140,577 B2 | 11/2006 | Mollet et al. |
| 7,290,170 B2 | 10/2007 | Anderson et al. |
| 7,505,820 B2 | 3/2009 | Plivcic et al. |
| 8,270,422 B2 | 9/2012 | Yin |
| 8,620,559 B2 | 12/2013 | Jehle et al. |
| 8,668,170 B2 | 3/2014 | Lostun et al. |
| 8,793,405 B2 | 7/2014 | Chen et al. |
| 8,856,413 B2 | 10/2014 | Schultz |
| 2005/0043859 A1 | 2/2005 | Tsai et al. |
| 2006/0174051 A1 | 8/2006 | Lordi et al. |
| 2007/0228223 A1 | 10/2007 | Dittmar et al. |
| 2009/0319056 A1 | 12/2009 | Meyer et al. |
| 2013/0079902 A1 | 3/2013 | Kamenetz et al. |
| 2013/0158844 A1 | 6/2013 | Grahle et al. |
| 2013/0294227 A1 | 11/2013 | Fukuzaki et al. |
| 2014/0351432 A1 | 11/2014 | Koponen et al. |
| 2015/0032302 A1 | 1/2015 | Foerster et al. |
| 2015/0053514 A1 | 2/2015 | Unsin et al. |

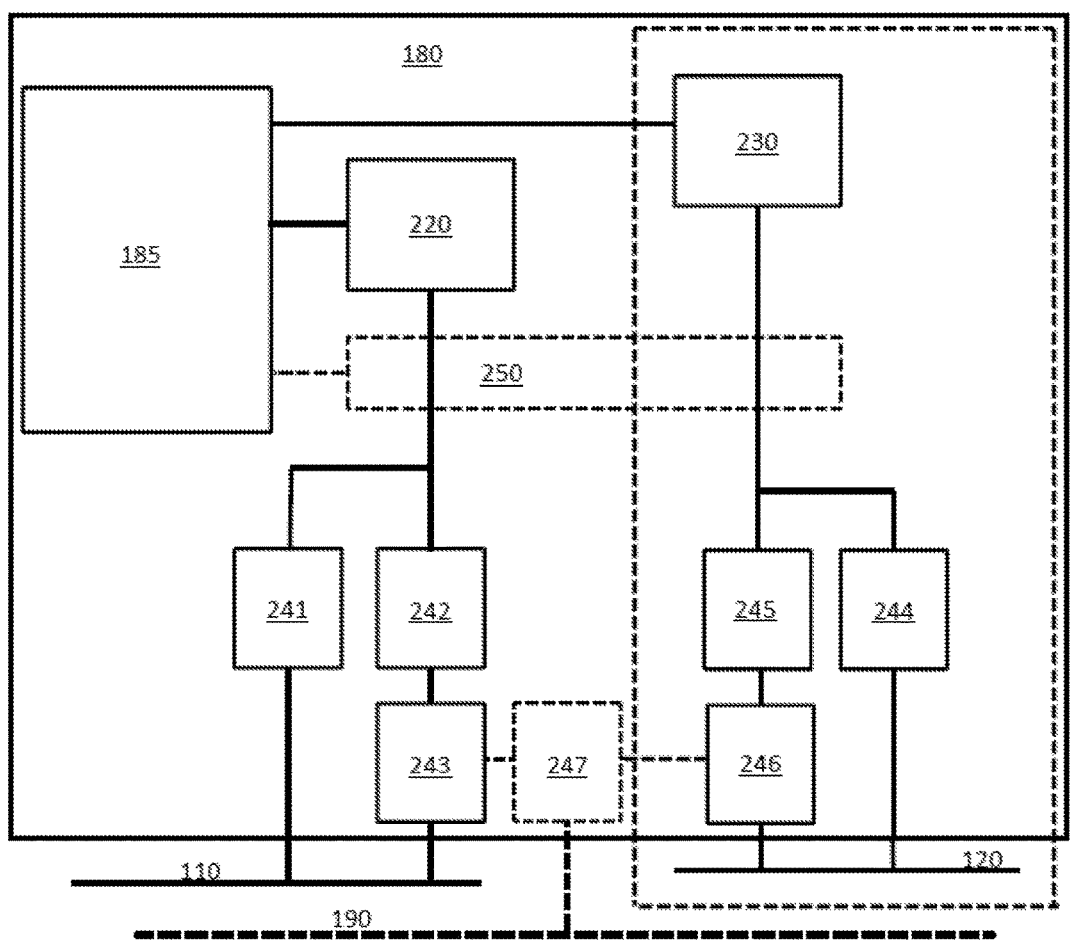

400

- 410 — Energize a first input to a safety device through a first power line, the safety device configured to actuate a safety apparatus in response to the first input being at a de-energized state for a first time interval.

- 420 — Energize the first power line by a first power source through a first switch, the first power source being controlled by a first control unit operating in a master state.

- 430 — End master state operation of the first control unit.

- 440 — In response to ending master state operation of the first control unit, open the first switch, close a second switch electrically coupled to the first power source, and energize the first power line by closing a third switch electrically coupled to the first power line, completing opening the first switch and closing the second switch and the third switch within the first time interval.

- 450 — Optionally energize a second input to the safety device through a second power line, energize the second power line by a second power source through a fourth switch, the second power source being controlled by the first control unit operating in master state, and, in response to ending master state operation of the first control unit, open the fourth switch, close a fifth switch electrically coupled to the second power source, and energize the second power line by closing a sixth switch electrically coupled to the second power line, completing opening the fourth switch and closing the fifth switch and the sixth switch within the first time interval.

- 460 — Optionally switch a second control unit from slave state to master state, and, in response, open the third switch and the fourth switch, and energize the first power line by closing a fifth switch electrically coupled to a second power source and to the first power line, completing opening the third switch and the fourth switch and closing the fifth switch within the first time interval.

- 470 — Optionally, prior to ending master state operation of the first control unit, execute a verification sequence to control the first power source by the first control unit to de-energize the first power line, and verify, by the first control unit, the de-energized state of the first power line.

510 — Energize a first input to a safety device through a first power line, the safety device configured to actuate a safety apparatus in response to the first input being at a de-energized state for a first time interval.

520 — Energize the first power line by a first power source through a first switch and a second switch, the first power source being controlled by a first control unit operating in a slave state.

530 — Switch operation of the first control unit from slave state to a master state.

540 — In response to beginning master state operation of the first control unit, open the first switch and the second switch, and energize the first power line by closing a third switch electrically coupled to the first power source and to the first power line. Opening the first switch and the second switch, and closing the third switch are completed within the first time interval.

550 — Optionally, in response to beginning master state operation of the first control unit, open a fourth switch between a second power source and the first power line, the second power source being controlled by a second control unit operating in slave state.

FIG 5

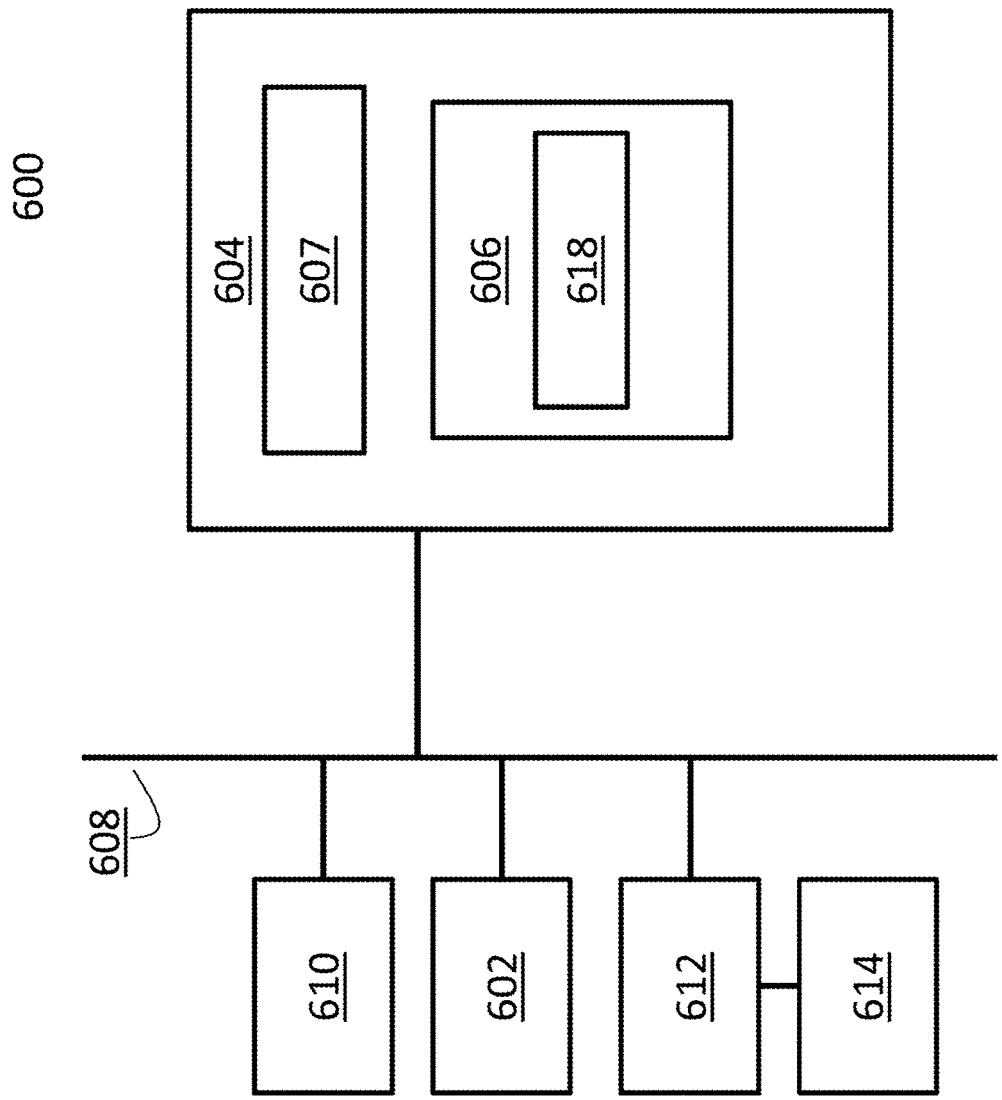

700

| 710 | Control a first power source by a first control unit to de-energize a first power line. |
| 720 | Verify, by the first control unit, the de-energized state of the first power line. |
| 730 | Optionally verify, by a second control unit, the de-energized state of the first power line. |
| 740 | Optionally de-energize, by the first control unit, an active control line. |
| 750 | Optionally verify, by the first control unit, the de-energized state of the active control line. |
| 760 | Optionally, after the de-energizing of the active control line, verifying, by the second control unit, active control line operation. |
| 770 | Optionally, energize, by the first control unit, the active control line during the verification of active control line operation by the second control unit. |
| 780 | Energize, by the first control unit, the first power line. |

FIG 7

SEAMLESS SWITCHOVER SYSTEM AND METHOD

BACKGROUND

To provide safety in the event of system failures, safety devices often are designed to actuate when an input that is energized during normal system operation becomes de-energized for a period of time. Some systems with such safety devices also include redundant controllers, each capable of operating in an active/master state for system control or in a passive/slave state, available to take control in the event that an active/master controller is no longer required for, or capable of, system control.

Switching control from a first controller to a second, redundant controller becomes problematic when the switchover takes longer than the safety device de-energization period, in which case the safety device unnecessarily actuates when not actually needed. In some systems, such as train control systems, a safety device may be an emergency braking system, and unneeded actuation of an emergency brake could slow the train unnecessarily and increase risk to passengers and crew as the emergency brake is applied.

While delays could be added to a safety device to allow controlled switchover before safety apparatus actuation, such delays introduce additional risks that would need to be accommodated, potentially increasing system complexity, reducing train headway, and increasing cost.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 2 is a schematic drawing illustrating a subsystem for seamless switchover of safety control, in some embodiments, showing a control unit, a power source, and switches coupled to the power source and to a power line;

FIG. 4 is a diagram for a method of seamlessly switching safety control, in some embodiments;

FIG. 5 is a diagram for a method of seamlessly switching safety control, in some embodiments;

FIG. 6 is a block diagram of a controller usable in accordance with one or more embodiments; and FIG. 7 is a diagram for a method of verifying operation of a system for seamless switchover of safety control.

DETAILED DESCRIPTION

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

The present description concerns a system and uses thereof. Although subject to other uses, the system is suitable to a vital or safety critical control system in which each of multiple redundant control units is able to switch between master and slave states without triggering actuation of a safety apparatus. Because safety apparatus actuation occurs after an input is de-energized for a time interval, seamless switchover is achieved by de-energizing and re-energizing the input before the time interval has elapsed. The system achieves seamless switchover of system control without relying on software timing or affecting the time required to actuate the safety apparatus.

Figure 1:
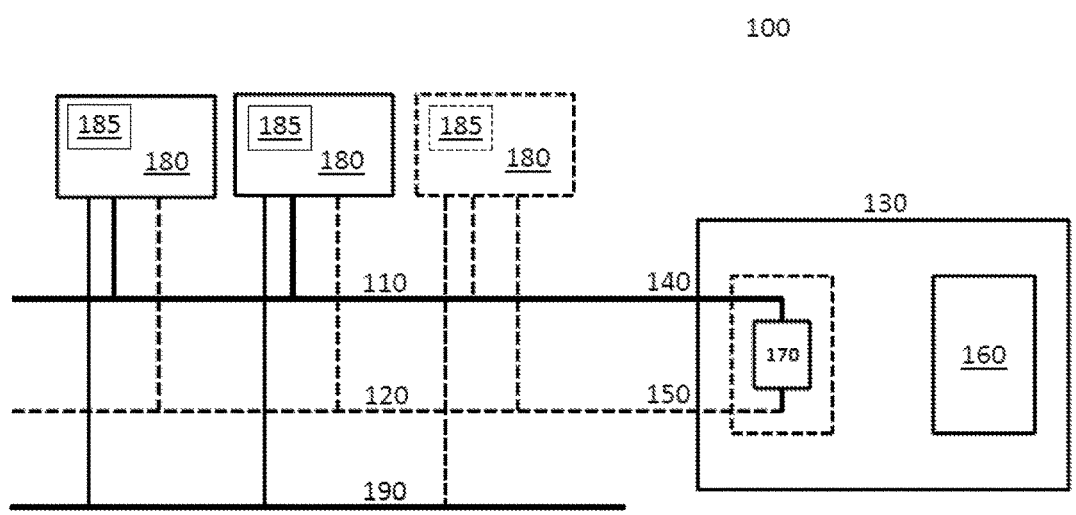
FIG. 1 is a schematic drawing illustrating a system for seamless switchover of safety control, in some embodiments, showing a safety device and a plurality of subsystems coupled to a power line.

Referring to FIG. 1, a system 100 for seamless switchover includes a first power line 110, a safety device 130 having a first input 140, and a plurality of subsystems 180, each of which includes a control unit 185. In at least some embodiments, system 100 comprises a second power line 120 and safety device 130 comprises a second input 150. In some embodiments, first power line 110 and second power line 120 are configured to have opposite polarities. In some embodiments, system 100 comprises an active control line 190.

System 100 includes at least two subsystems 180. In some embodiments, system 100 includes more than two subsystems 180. In some embodiments, subsystems 180 are identical. In some embodiments, subsystems 180 vary with respect to composition but are uniform with respect to the features described below. In some embodiments, each of subsystems 180 is a safety subsystem.

Control unit 185 is a computing device comprising one or more processing units. In some embodiments, control unit 185 is a safety computing device. In some embodiments, control unit 185 has a checked redundant configuration having a first computing device and a second computing device. In some embodiments, control unit 185 is a vital on-board controller (VOBC) of a train. In some embodiments, a VOBC is implemented by running a background process on every vital machine having safety integrity level 4 (SIL 4) in system 100 which listens to communication traffic and collects key data as identified by a configuration profile of the VOBC. SIL 4 is based on International Electrotechnical Commission's (IEC) standard IEC 61508 and corresponds to a probability of hazards per hour ranging from $10^{-8}$ to $10^{-9}$. In some embodiments, control unit 185 is controller 600 described below with respect to FIG. 6.

Control unit 185 is configured to be switchable between a master state and a slave state. In operation, control unit 185 operating in the master state is capable of controlling system 100. In operation, control unit 185 operating in the slave state is capable of controlling only a portion of system 100. System 100 is configured so that only one control unit 185 is capable of being in the master state at any given time.

First power line 110 and, if present, second power line 120, are an electrical conductor or plurality of conductors capable of delivering electrical energy between devices over a distance. In some embodiments, first power line 110 and, if present, second power line 120, are emergency brake trainlines of a train. In some embodiments, first power line 110 and, if present, second power line 120, are emergency brake trainlines of a train that span more than one train car.

Safety device 130 comprises first input 140, a safety apparatus 160 and/or relay 170. In some embodiments, safety device 130 comprises second input 150. Safety device 130 is an assembly configured to actuate safety apparatus 160 after a time interval has elapsed. In some embodiments, safety device 130 is an emergency braking control system and safety apparatus 160 is an emergency brake. In some embodiments, safety device 130 is an emergency braking control system of a train and safety apparatus 160 is an emergency brake of the train.

Safety device 130 is configured to actuate safety apparatus 160 based on first input 140 being in a de-energized state for a predetermined time interval. A de-energized state is a condition in which a potential energy, or voltage, level of a component of system 100 is at or near a ground or reference voltage level. In some embodiments, a potential energy, or voltage, level at or near the ground or reference voltage level is defined as a potential energy, or voltage, level having a magnitude below a first predetermined level.

An energized state is a condition in which the potential energy, or voltage, level of the component of system 100 has a magnitude above a second predetermined level. In various embodiments, the energized state corresponds to a potential energy, or voltage, of either polarity. In some embodiments, the first predetermined level is different from the second predetermined level. In some embodiments, the first predetermined level is the same as the second predetermined level.

In some embodiments, first input 140 is an input to relay 170. In some embodiments, relay 170 is configured so that, in operation, the de-energized state for the predetermined time interval at first input 140 causes relay 170 to open, thereby actuating safety apparatus 160.

In some embodiments, safety device 130 is configured to actuate safety apparatus 160 based on either first input 140 or second input 150 being in the de-energized state for the predetermined time interval. In some embodiments, first input 140 and second input 150 are inputs to relay 170. In some embodiments, relay 170 is configured so that, in operation, the de-energized state for the predetermined time interval at either of first input 140 or second input 150 causes relay 170 to open, thereby actuating safety apparatus 160.

In some embodiments, the predetermined time interval ranges from 100 milliseconds (msec) to 400 msec. In some embodiments, the predetermined time interval ranges from 200 msec to 300 msec.

First input 140 is electrically coupled to first power line 110. Each subsystem 180 is electrically coupled to first power line 110 and is capable of energizing and de-energizing first power line 110. In some embodiments, second input 150 is electrically coupled to second power line 120. In some embodiments, each subsystem 180 is electrically coupled to second power line 120 and is capable of energizing and de-energizing second power line 120. In some embodiments, each subsystem 180 is electrically coupled to first power line 110 and second power line 120 and is capable of energizing and de-energizing first power line 110 at a first polarity and energizing and de-energizing second power line 120 at a second polarity.

In some embodiments, each subsystem 180 is electrically connected to active control line 190. Active control line 190 is an electrical conductor or plurality of conductors capable of delivering electrical energy between devices over a distance. In some embodiments, active control line 190 is an active control line of a train. In some embodiments, active control line 190 is an active control line of a train that spans more than one train car.

In some embodiments, control unit 185 is configured to output one or more signals indicative of operating in either the master state or the slave state or of being in a failed state or otherwise shut down. In some embodiments, control unit 185 is configured to indicate master state operation by energizing active control line 190.

Each subsystem 180 is configured so that its control unit 185 is capable of causing subsystem 180 to energize first power line 110 and, if present, second power line 120, while its control unit 185 is in either the master state or the slave state.

System 100 is configured so that if a control unit 185 of a given subsystem 180 is in the master state, each control unit 185 of each other subsystem 180 is prevented from energizing first power line 110 and, if present, second power line 120.

In operation, prior to a given control unit 185 of a subsystem 180 switching from the slave state to the master state, two possible scenarios exist. In the first scenario, the given control unit 185 is taking over for a second control unit 185 that was previously in the master state. In the second scenario, the given control unit 185 is asserting control when all control units 185 of system 100 were previously in slave states.

In the first scenario, in operation, subsystem 180 of the second control unit 185 energizes first power line 110 and, if present, second power line 120 prior to the given control unit 185 switching to the master state. In the second scenario, in operation, every subsystem 180 of system 100 energizes first power line 110 and, if present, second power line 120 prior to the given control unit 185 switching to the master state.

In the second scenario, in operation, the given control unit 185 of a first subsystem 180 switching from the slave state to the master state causes first subsystem 180 to continue energizing first power line 110 and, if present, second power line 120.

In both scenarios, in operation, the given control unit 185 of the first subsystem 180 switching from the slave state to the master state also causes any second subsystem 180 to stop energizing first power line 110 and, if present, second power line 120. In some embodiments, in operation, the given control unit 185 switching from the slave state to the master state causes any second subsystem 180 to stop energizing first power line 110 and, if present, second power line 120, by energizing active control line 190, as discussed below.

System 100 is configured so that, in both scenarios, in operation, first subsystem 180 starts energizing first power line 110 and, if present, second power line 120, before the predetermined time interval for actuating safety apparatus 160 elapses after the second subsystem stops energizing first power line 110 and, if present, second power line 120.

In operation, because first power line 110 and, if present, second power line 120, is/are not de-energized for longer than the predetermined time interval, safety apparatus 160 is not actuated. By avoiding actuation of safety apparatus 160, system 100 is configured to provide seamless switchover of control to a control unit 185 switching from slave state to master state. An example embodiment of a subsystem 180 configured to provide seamless switchover for system 100 is discussed below with respect to FIG. 2.

Referring to FIG. 2, a subsystem 180 includes control unit 185, a first power source 220, a first switch 241, a second switch 242, and a third switch 243. In some embodiments, subsystem 180 includes a second power source 230, a fourth switch 244, a fifth switch 245, and a sixth switch 246. In some embodiments, subsystem 180 includes a switch control 247. In some embodiments, subsystem 180 includes a vital supervision card (VSC) 250.

Subsystem 180 is a first subsystem of a plurality of subsystems 180 in system 100. Each of first subsystem 180, a second subsystem 180, and, if present, one or more additional subsystems 180, is configured to include the features described with respect to FIG. 2. In some embodiments, individual instances of subsystem 180 throughout system 100 are identically composed. In some embodiments, individual instances of subsystem 180 throughout system 100 are not identically composed.

In the discussion below, components of subsystem 180 are first described, followed by an explanation of how the various components are configured so as to interact to enable seamless switchover. Control unit 185 is configured to control first power source 220 and, if present, second power source 230. In operation, control unit 185 operating in the master state or in the slave state is capable of controlling first power source 220 and, if present, second power source 230. First switch 241 is electrically coupled to first power source 220 and to first power line 110. Second switch 242 is electrically coupled to first power source 220 and to third switch 243. Third switch 243 is electrically coupled to second switch 242 and to first power line 110.

In some embodiments, switch control 247 is electrically coupled to active control line 190, switch 243, and, if present, switch 246.

By the configuration of subsystem 180, in operation, if first switch 241 is open, first power source 220 cannot energize first power line 110 through the path that includes first switch 241. In operation, if either second switch 242 or third switch 243 is open, first power source 220 cannot energize first power line 110 through the path that includes second switch 242 and third switch 243.

In operation, first power source 220 potentially energizes first power line 110 if either first switch 241 is closed or if both second switch 242 and third switch 243 are closed.

In some embodiments, fourth switch 244 is electrically coupled to second power source 230 and to second power line 120. In some embodiments, fifth switch 245 is electrically coupled to second power source 230 and to sixth switch 246. Sixth switch 246 is electrically coupled to fifth switch 245 and to second power line 120.

By the configuration of subsystem 180, in some embodiments, in operation, if fourth switch 244 is open, second power source 230 cannot energize second power line 120 through the path that includes fourth switch 244. In some embodiments, in operation, if either fifth switch 245 or sixth switch 246 is open, second power source 220 cannot energize second power line 120 through the path that includes fifth switch 245 and sixth switch 246.

In some embodiments, in operation, second power source 230 potentially energizes second power line 120 if either fourth switch 244 is closed or if both fifth switch 245 and sixth switch 246 are closed.

Each of switches 241-246 is configured to switch between open and closed states in a time period that is less than the predetermined time interval for actuation of safety apparatus 160. In some embodiments, in operation, each of switches 241-246 switches between open and closed states in a time period that ranges from 10 msec or less to 90 msec. In some embodiments, in operation, each of switches 241-246 switches between open and closed states in a time period that ranges from 20 msec to 60 msec. In some embodiments, in operation, each of switches 241-246 switches between open and closed states in a time period of about 40 msec.

Because each of switches 241-246 is configured to switch between open and closed states in a time period that is significantly less than the predetermined time interval for actuation of safety apparatus 160, the configurations of system 100 and each subsystem 180 enable seamless switchover of control to control unit 185 switching to the master state, as discussed below.

In some embodiments, with respect to FIGS. 1-3C, each of second power source 230, second power line 120, fourth switch 244, fifth switch 245, and sixth switch 246 is configured as described below for first power source 220, first power line 110, first input 140, first switch 241, second switch 242, and third switch 243, respectively, and system 100 is configured accordingly so that, in operation, each of second power source 230, second power line 120, second input 150, fourth switch 244, fifth switch 245, and sixth switch 246 functions as described below for first power source 220, first power line 110, first input 140, first switch 241, second switch 242, and third switch 243, respectively.

In some embodiments, system 100 is configured so that, in operation, at least one of second power source 230, second power line 120, second input 150, fourth switch 244, fifth switch 245, and sixth switch 246 functions as described below for first power source 220, first power line 110, first input 140, first switch 241, second switch 242, and third switch 243, respectively, and is controlled to operate in tandem with its respective counterpart.

In some embodiments, control unit 185 is configured to perform self-tests to detect failures, and, if detected, shut down from either the master state or the slave state into the failed state. In some embodiments, in operation, in the failed state, control unit 185 is not capable of controlling first power source 220, second power source 230, if present, or other elements of the general system that includes system 100. In operation, control unit 185 transitioning from, or ending, operation in the master state includes either switching to the slave state or to shutting down, including due to entering the failed state.

In some embodiments, control unit 185 comprises one or more inputs configured to allow verification of the energized or de-energized state of one or more of first power line 110 and, if present, second power line 120 and active control line 190. In some embodiments, third switch 243 and, if present, sixth switch 246 are contacts of a relay and control unit 185 comprises an input capable of sensing the status of one or more contacts of the relay.

First power source 220 is an assembly capable of energizing first power line 110 and of being controlled by control unit 185. In some embodiments, second power source 230 is an assembly capable of energizing second power line 120 and of being controlled by control unit 185. In some embodiments, first power source 220 has a first polarity and second power source has a second polarity opposite the first polarity. In some embodiments, first power source 220 and second power source 230 are configured to be controlled separately by control unit 185. In some embodiments, first power source 220 and second power source 230 are configured to be controlled in tandem by control unit 185 such that, in operation, first power source 220 and second power source 230 are powered on and off simultaneously.

In some embodiments, vital supervision card (VSC) 250 is configured to further control an energizing output of first power source 220 and an energizing output of second power source 230, if present. In some embodiments, VSC 250 is activated only when control unit 185 is healthy. In some embodiments, first switch 241 and second switch 242 are electrically coupled to first power source 220 through VSC 250. In some embodiments, fourth switch 244 and fifth switch 245 are electrically coupled to second power source 230 through VSC 250.

In some embodiments, VSC 250 is configured to monitor a dynamic output signal from control unit 185 and control delivery of power from first power source 220 to switches 241 and 242 based on detection of a valid output signal. In some embodiments, VSC 250 is configured to monitor a dynamic output signal from control unit 185 and control delivery of power from second power source 230 to switches 244 and 245 based on detection of a valid output signal.

In some embodiments, in operation, control unit 185 transitions out of the master or the slave state into the failed state as a result of a failure by VSC 250 to detect a valid output signal from control unit 185. In some embodiments, VSC 250 is configured for safety integrity level 4 (SIL 4) compliance.

First switch 241 is configured to be closed while control unit 185 is operating in the master state and open while control unit 185 is not operating in the master state, in which case switch 241 is open and control unit 185 is in the slave state or the failed state or otherwise shut down. Second switch 242 is configured to be open while control unit 185 is operating in the master state and closed while control unit 185 is not operating in the master state, in which case second switch 242 is closed and control unit 185 is in the slave state or the failed state or otherwise shut down.

In some embodiments, first switch 241 and second switch 242 are contacts of a relay configured with an "exclusive-or" logic so that, in operation, one contact is always closed while the other contact is open. In some embodiments, first switch 241 and second switch 242 are contacts of a safety relay such as a force-activated relay (FAR).

In some embodiments, first switch 241 and second switch 242 are configured to respond to one or more signals indicative of control unit 185 operating in the master state or the slave state or of being in the failed state or otherwise shut down. In some embodiments, first switch 241 and second switch 242 are contacts of a relay configured to respond to one or more signals indicative of control unit 185 operating in either the master state or the slave state or of being in the failed state or otherwise shut down.

In operation, while control unit 185 is in the master state, first switch 241 is closed, and control unit 185 controls first power source 220 to energize and/or de-energize first power line 110 through first switch 241, thereby energizing and/or de-energizing first input 140 of safety device 130 to control safety apparatus 160.

In operation, while control unit 185 is in the slave state or in the failed state or otherwise shut down, first switch 241 is open and control unit 185 is not capable of energizing first power line 110 through first switch 241 so as to prevent actuation of safety apparatus 160 due first input 140 being de-energized for the time interval.

Third switch 243 is configured to be open while control unit 185 of first subsystem 180 of FIG. 2 is in the master state, or while control unit 185 of any one of additional subsystems 180 of system 100 is in the master state. In some embodiments, third switch 243 is a contact of a safety relay, such as a FAR relay.

In some embodiments, third switch 243 is configured to respond to one or more signals indicative of a control unit 185 of any one of subsystem 180 in system 100 operating in the master state or the slave state or of being in the failed state or otherwise shut down. In some embodiments, third switch 243 is configured to open in response to actuation of switch control 247.

In some embodiments, switch control 247 is configured to actuate third switch 243 in response to active control line 190 being energized. In some embodiments, switch control 247 is a FAR relay and third switch 243 is a contact of the FAR relay configured to be open when switch control 247 is actuated in response to active control line 190 being energized by any control unit 185 of any subsystem 180.

In some embodiments, switch control 247 is an assembly configured to, in response to a signal indicative of any control unit 185 of any one of subsystem 180 in system 100 operating in the master state, cause third switch 243 to switch from a closed state to an open state in a time period that is less than the predetermined time interval for actuation of safety apparatus 160.

Figure 2A:
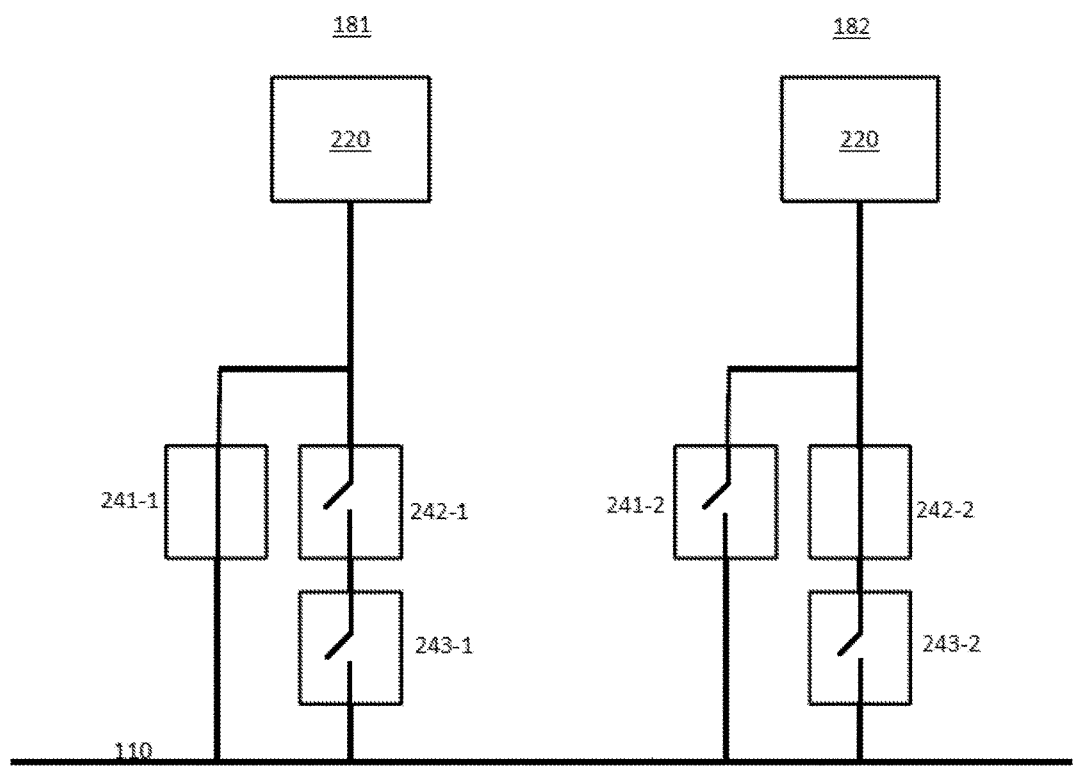
FIGS. 2A and 2B are schematic drawings illustrating two redundant subsystems for seamless switchover of safety control, in some embodiments, showing a power source and switches coupled to the power source for each subsystem and a power line.
Figure 2B:
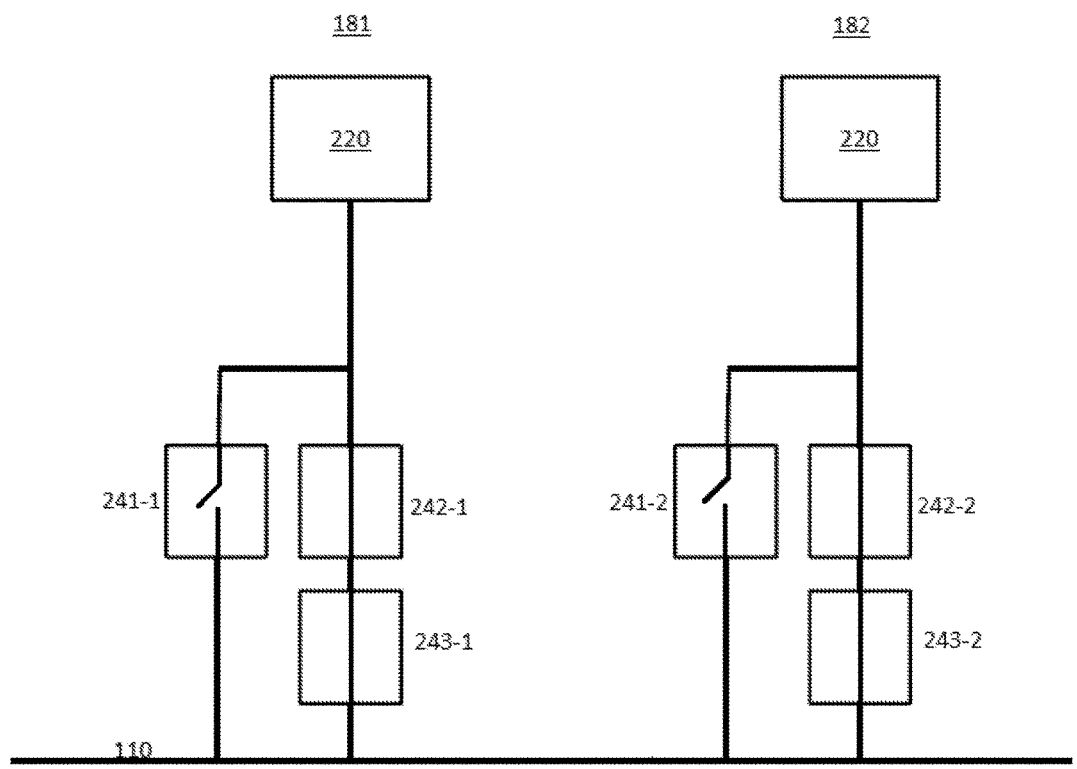

Referring to FIGS. 2A and 2B, a subset of components of a system 100 includes first power line 110, a first subsystem 181, and a second subsystem 182. First subsystem 181 includes a first switch 241-1, a second switch 242-1, and a third switch 243-1. Second subsystem 182 includes a first switch 241-2, a second switch 242-2, and a third switch 243-2. For clarity, not all components of system 100, first subsystem 181, and second subsystem 182 are shown. FIG. 2A shows the switch positions when control unit 185 (not shown) of first subsystem 181 is in the master state and control unit 185 (not shown) of second subsystem 182 is in the slave state. FIG. 2B shows the switch positions when both control units 185 of first subsystem 181 and second subsystem 182 are in the slave state.

In operation, control unit 185 (not shown) of first subsystem 181 of FIG. 2A is in the master state, so second switch 242-1 and third switch 243-1 are open, and control unit 185 is not capable of energizing first power line 110 through second switch 242-1 and third switch 243-1, instead energizing first power line 110 through closed first switch 241-1, as described above.

In operation, control unit 185 (not shown) of second subsystem 182 of FIG. 2A is in the slave state, second switch 242-2 is closed and third switch 243-2 is open. In this switch configuration, second subsystem 182 is not capable of energizing first power line 110 through second switch 242-2 and third switch 243-2. In operation, because first switch 241-2 is open, second subsystem 182 is also not capable of energizing first power line 110 through first switch 241-2. In operation, because control unit 185 of second subsystem 182 of FIG. 2A is in the slave state and control unit 185 of first subsystem 181 of system 100 is in the master state, second subsystem 182 of FIG. 2A is not capable of energizing, preventing, or interfering with actuation of safety apparatus 160.

In operation, both control unit 185 of first subsystem 181 and control unit 185 of second subsystem 182 of FIG. 2B are in the slave state, and no control unit 185 of any additional subsystems 180 of system 100 is in the master state, so every control unit 185 of every subsystem 181, 182, and, if present, 180 is in the slave state. In some embodiments, in operation, control unit 185 of first subsystem 181 or second subsystem 182 is in the failed state and has the switch configuration illustrated in FIG. 2B. If a control unit 185 is in the failed state, in some embodiments, the associated VSC 250 prevents delivery of power to the switches.

In the switch configuration illustrated in FIG. 2B, both second switch 242-1 and third switch 243-1 of first subsystem 181 are closed, while first switch 241-1 is open. Second subsystem 182 has an identical configuration, so both second switch 242-2 and third switch 243-2 are closed while first switch 241-2 is open. First subsystem 181 is therefore capable of energizing first power line 110 through second switch 242-1 and third switch 243-1, and second subsystem 182 is capable of energizing first power line 110 through second switch 242-2 and third switch 243-2. Either first subsystem 181 or subsystem 182 is thereby capable of controlling safety apparatus 160 while in the slave state and not in the failed state, as described above.

Referring again to FIG. 2, by the configuration of subsystem 180, in operation, if control unit 185 transitions from the master state to the slave state or to the failed state or otherwise shuts down, first switch 241 opens and second switch 242 closes. Also, third switch 243 closes until control unit 185 of another subsystem 180 of system 100 transitions from the slave state to the master state. If control unit 185 transitions to the slave state, any control unit 185 is capable of controlling first power source 220 to energize first power line 110 through second switch 242 and third switch 243.

In operation, whether control unit 185 transitions to the slave state or shuts down, until control unit 185 of another subsystem 180 of system 100 transitions from the slave state to the master state, control unit 185 of at least one other subsystem 180 of system 100 is capable of controlling an associated first power source 220 to energize first power line 110 through associated second switch 242 and third switch 243.

By the configuration of subsystem 180, in operation, if control unit 185 transitions from the slave state to the master state, first switch 241 closes and second switch 242 opens. Also, in some embodiments, because system 100 is configured so that only one control unit 185 can be in the master state at any given time and no control unit of another subsystem 180 can be in the master state, in operation, third switch 243 opens from a previously closed condition. In some embodiments, in operation, third switch 243 opens from a previously closed condition because active control line 190 becomes energized by control unit 185 of subsystem 180 transitioning to the master state.

In operation, the situation in which control unit 185 transitions from the slave state to the master state applies if control unit 185 is taking control from an initialized state in which control unit 185 of each subsystem 180 of system 100 is in the slave state. This situation also applies if control unit 185 takes control following failure of control unit 185 of another subsystem 180 of system 100, which initially results in a similar state in which control unit 185 of each subsystem 180 of system 100 is in the slave state.

Figure 3A:
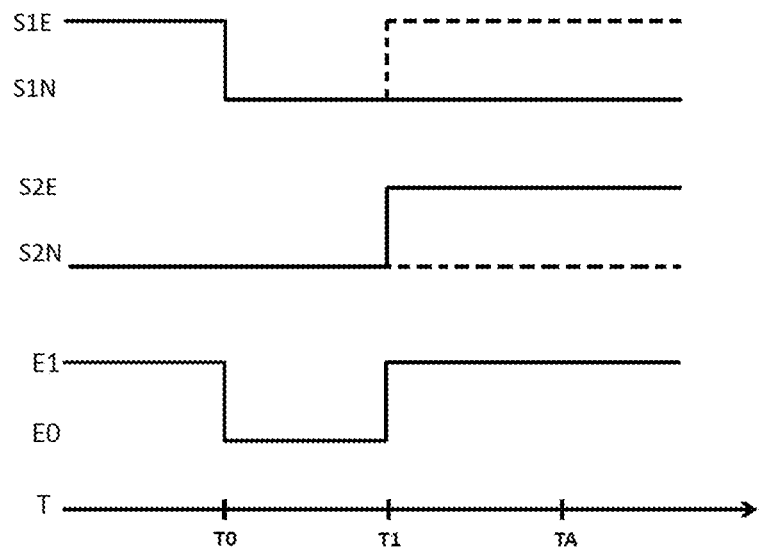
FIG. 3A is a graphical illustration of energizing and de-energizing timing according to one or more embodiments.
Figure 3B:
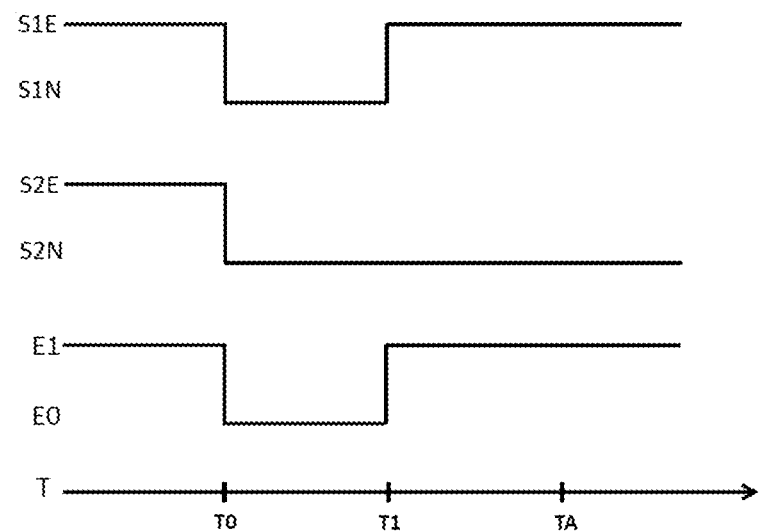
FIG. 3B is a graphical illustration of energizing and de-energizing timing according to one or more embodiments.

FIGS. 3A and 3B illustrate energizing and de-energizing timing for system 100, in some embodiments. E0 represents a de-energized state of first power line 110 and first input 140 of safety device 130. E1 represents an energized state of first power line 110 and first input 140. Time T is indicated along the horizontal axis as points T0, T1, and TA, with the period from time T0 to TA representing the predetermined time interval for actuation of safety apparatus 160, as described above with respect to FIG. 1.

The operational timing illustrated in FIGS. 3A and 3B is not to scale, so the distances between points T0, T1, and TA do not necessarily represent relative time spans between the various points.

As discussed below, while FIGS. 3A and 3B include periods in which first power line 110 is de-energized, not all embodiments include such periods. In some embodiments, switch timing is such that first power line 110 remains energized throughout an operational sequence illustrated in FIG. 3A and/or FIG. 3B.

S1E represents a subsystem state in which first power line 110 is energized by the first power source 220 of a first subsystem 180, through closure of either first switch 241 or second switch 242 and third switch 243. S1N represents a state in which first power line 110 is not energized by first power source 220 of first subsystem 180, based on first switch 241 being open and at least one of second switch 242 and third switch 243 being open.

S2E represents a subsystem state in which first power line 110 is energized by the first power source 220 of a second subsystem 180, through closure of either first switch 241 or second switch 242 and third switch 243. S2N represents a state in which first power line 110 is not energized by first power source 220 of second subsystem 180, based on first switch 241 being open and at least one of second switch 242 and third switch 243 being open.

Because first power line 110 can be energized by first power source 220 of either first or second subsystem 180, either or both of states S1E and S2E creates energized state E1, while a combination of both states S1N and S2N is required for de-energized state E0.

A first operational sequence, illustrated in FIG. 3A, occurs when a control unit 185 of a first subsystem 180 transitions out of the master state and, at least temporarily, no other control unit 185 of another subsystem 180 transitions out of the slave state into the master state.

A second operational sequence, illustrated in FIG. 3B, occurs when a control unit 185 of a first subsystem 180 transitions into the master state from an initial state in which no control unit 185 of any subsystem 180 is in the master state. In some embodiments, the initial state represents an initial state of system 100. In some embodiments, the initial state represents a transitional state in which a control unit 185 of another subsystem 180 has transitioned out of the master state and each control unit 185 of each subsystem 180 is in the slave state. In some embodiments, the initial state represents the end of the first operational sequence.

In some embodiments, FIG. 3A illustrates the first operational sequence in which, prior to time T0, control unit 185 of first subsystem 180 is in the master state (state S1E) and control unit 185 of second subsystem 180 is in the slave state (state S2N). At time T0, in response to a transition of control unit 185 of first subsystem 180 out of the master state, switch 241 of first subsystem 180 opens and first power line 110 is no longer energized through first subsystem 180.

At time T0 in the first operational sequence, first subsystem 180 therefore changes from state S1E to state S1N while second subsystem 180 remains at state S2N until the associated switches have changed states. With first subsystem 180 in state S1N and second subsystem 180 in state S2N, first power line 110 therefore transitions to de-energized state E0 at time T0, as illustrated in FIG. 3A.

At time T1 in the first operational sequence, in some embodiments, third switch 243 of second subsystem 180 closes in response to the transition of control unit 185 of first subsystem 180 out of the master state. Because control unit 185 of second subsystem 180 is in the slave state, second switch 242 is already closed, and closing of third switch 243 allows first power source 220 of second subsystem 180 to energize first power line 110, thereby changing second subsystem 180 from state S2N to S2E. In some embodiments, switch 243 closes in response to active control line 190 becoming de-energized by control unit 185 of first subsystem 180 transitioning out of the master state.

With first subsystem 180 in state S1N and second subsystem 180 in state S2E, first power line transitions from de-energized state E0 to energized state E1 at time T1, as illustrated by the solid lines in FIG. 3A.

At time T1 in the first operational sequence, in some embodiments, control unit 185 of second subsystem 180 transitions from the slave state to the master state in response to control unit 185 of first subsystem 180 transitioning out of the master state. In this case, first switch 241 of second subsystem 180 closes in response to the transition of control unit 185 of second subsystem 180 into the master state, so first power source 220 of second subsystem 180 energizes first power line 110 and second subsystem 180 transitions from state S2N to S2E. With first subsystem 180 in state S1N and second subsystem 180 in state S2E, first power line transitions from de-energized state E0 to energized state E1 at time T1, as illustrated by the solid lines in FIG. 3A.

At time T1 in the first operational sequence, in some embodiments, third switch 243 of first subsystem 180 closes in response to transition of control unit 185 of first subsystem 180 out of the master state to the slave state. Because control unit 185 of first subsystem 180 has transitioned to the slave state, second switch 242 closes, and closing of third switch 243 allows first power source 220 of first subsystem 180 to energize first power line 110, thereby changing first subsystem 180 from state S1N to S1E. With first subsystem 180 in state S1E and second subsystem 180 in state S2N, illustrated by the dashed lines in FIG. 3A, first power line transitions from de-energized state E0 to energized state E1 at time T1.

At time T1 in the first operational sequence, in some embodiments, third switch 243 of both first subsystem 180 and second subsystem 180 close at time T1. In this case, first subsystem 180 transitions from S1N to S1E, as illustrated by the dashed line, and second subsystem 180 transitions from S2N to S2E, as illustrated by the solid line. With first subsystem 180 in state S1E and second subsystem 180 in state S2E, first power line transitions from de-energized state E0 to energized state E1 at time T1.

As illustrated in FIG. 3A, by the configuration of system 100, the period from T0 to T1 for the first operational sequence is less than the time interval for actuation of safety apparatus 160, T0 to TA, so that, in operation, first power line 110 is re-energized before actuation of safety apparatus 160. In various embodiments, switches 241, 242, and 243 of each subsystem 180 have response and switching times such that transitions between states S1E, S1N, S2E and S2N for the first operational sequence overlap, resulting in the period from T0 to T1 being effectively zero, meaning that the operational sequence does not include a de-energized state E0, in which case first power line 110 remains in energized state E1 throughout the first operational sequence.

In some embodiments, FIG. 3B illustrates the second operational sequence in which, prior to time T0, no control unit 185 of a subsystem 180 is in the master state. Therefore, prior to time T0, control unit 185 of a first subsystem 180 is in the slave state and energizing first power line 110 through switches 242 and 243 (state S1E), and control unit 185 of a second subsystem 180 is also in the slave state and also energizing first power line 110 through switches 242 and 243 (state S2E).

At time T0 in the second operational sequence, control unit 185 of first subsystem 180 transitions from the slave state to the master state, and switch 243 of both first subsystem 180 and second subsystem 180 opens. Therefore, first subsystem 180 transitions from state S1E to state S1N and second subsystem 180 transitions from state S2E to state S2N. With first subsystem 180 in state S1N and second subsystem 180 in state S2N, first power line 110 therefore transitions to de-energized state E0 at time T0, as illustrated in FIG. 3B.

At time T1 in the second operational sequence, in some embodiments, in response to control unit 185 of first subsystem 180 transitioning from the slave state to the master state, first switch 241 of first subsystem 180 closes and first power source 220 of first subsystem 180 energizes first power line 110, first subsystem 180 thereby transitioning from state S1N to S1E while second subsystem 180 remains in state S2N. With first subsystem 180 in state S1E and second subsystem 180 in state S2N, first power line 110 transitions from de-energized state E0 to energized state E1 at time T1, as illustrated in FIG. 3B.

As illustrated in FIG. 3B, by the configuration of system 100, the period from T0 to T1 for the second operational sequence is less than the time interval for actuation of safety apparatus 160, T0 to TA, so that, in operation, first power line 110 is re-energized before actuation of safety apparatus 160. In various embodiments, switches 241, 242, and 243 of each subsystem 180 have response and switching times such that transitions between states S1E and S1N for the second operational sequence overlap, resulting in the period from T0 to T1 being effectively zero, in which case first power line 110 remains in energized state E1 throughout the second operational sequence.

Figure 3C:
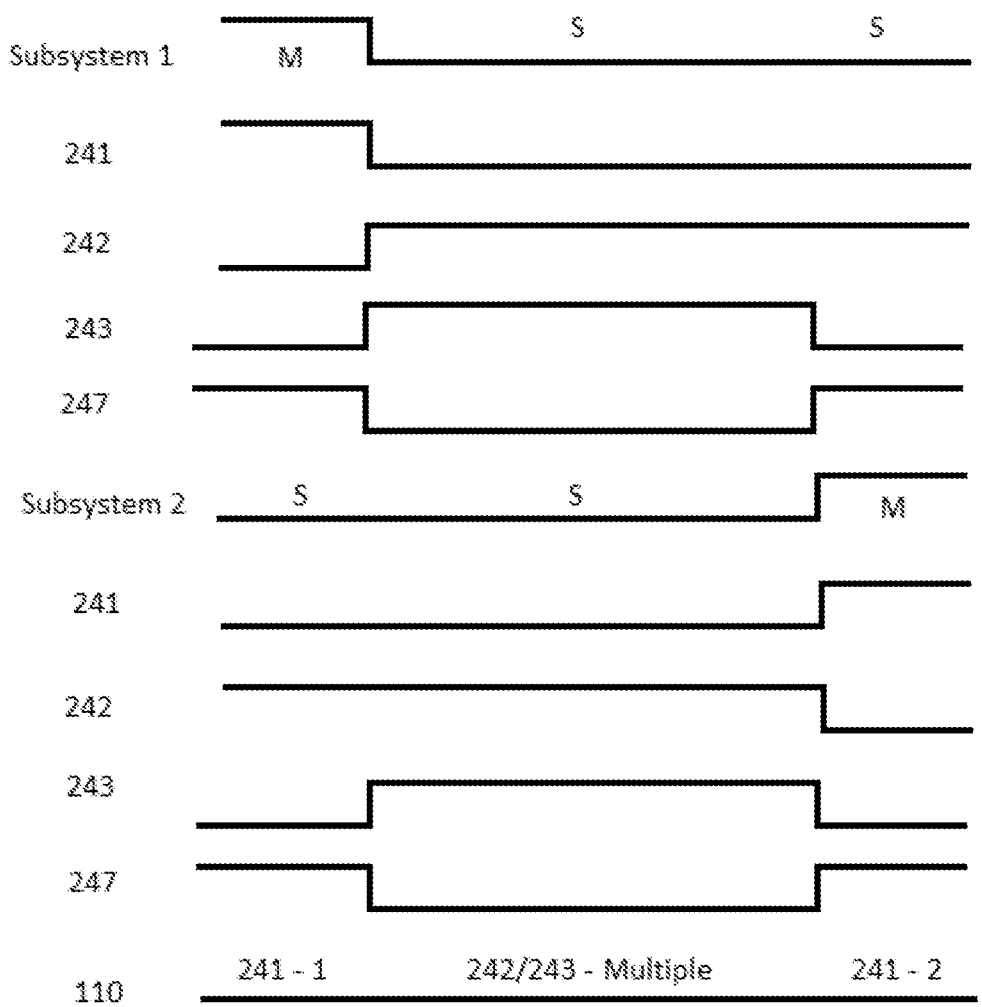
FIG. 3C is a graphical illustration of energizing and de-energizing timing according to one or more embodiments.

FIG. 3C illustrates a third operational sequence in which a subsystem 1, e.g., first subsystem 180, switches from a master state M to a slave state S and a subsystem 2, e.g., second subsystem 180, switches from slave state S to master state M. A switch state of closed is illustrated as a logic high and a switch state of open is illustrated as a logic low.

While subsystem 1 is in master state M, switch 241 of subsystem 1 is closed while switches 242 and 243 are open. When subsystem 1 switches to slave state S, switch 241 opens while switches 242 and 243 close. Switch 243 remains closed until subsystem 2 switches from slave state S to master state M, at which time switch 243 opens.

While subsystem 2 in slave state S, switch 241 of subsystem 2 is open. When subsystem 2 switches from slave state S to master state M, switch 241 closes while switches 242 and 243 open.

First power line 110 remains energized throughout the third operational sequence. While subsystem 1 is in master state M and subsystem 2 is in slave state S, first power line 110 is energized at 241-1 by switch 241 of subsystem 1. While subsystem 1 and subsystem 2 are both in slave state S, first power line 110 is energized at 242/243—Multiple by switches 242 and 243 in both subsystem 1 and subsystem 2. While subsystem 1 is in slave state S and subsystem 2 is in master state M, first power line 110 is energized at 241-2 by switch 241 of subsystem 2.

The present description also concerns methods of seamlessly switching control. An example embodiment of a method 400 of seamlessly switching control is depicted in FIG. 4. Various embodiments include some or all of the operations depicted in FIG. 4. In some embodiments, method 400 is implemented using system 100, described above with respect to FIGS. 1-3C.

In operation 410, a first input to a safety device is energized through a first power line, the safety device configured to actuate a safety apparatus in response to the first input being at a de-energized state for a first time interval.

In operation 420, the first power line is energized by a first power source through a first switch, the first power source being controlled by a first control unit operating in a master state.

In operation 430, master state operation of the first control unit is ended. In some embodiments, ending master state operation comprises transitioning to a slave state. In some embodiments, ending master state operation comprises transitioning to a failed state or otherwise being shut down.

In operation 440, In response to ending master state operation of the first control unit, the first switch is opened, a second switch electrically coupled to the first power source is closed, and the first power line is energized by closing a third switch electrically coupled to the first power line. Opening the first switch and closing the second switch and the third switch are completed within the first time interval.

In operation 450, in some embodiments, a second input to the safety device is energized through a second power line, the second power line is energized by a second power source through a fourth switch, the second power source being controlled by the first control unit operating in master state. In response to ending master state operation of the first control unit, the fourth switch is opened, a fifth switch electrically coupled to the second power source is closed, and the second power line is energized by closing a sixth switch electrically coupled to the second power line. Opening the fourth switch and closing the fifth switch and the sixth switch are completed within the first time interval.

In operation 460, in some embodiments, a second control unit is switched from slave state operation to master state operation, and, in response, the third switch and the sixth switch are opened. The second control unit controls a third power source and the first power line is energized by closing a seventh switch electrically coupled to the third power source and to the first power line. Opening the third switch and the sixth switch and closing the seventh switch are completed within the first time interval.

In operation 470, in some embodiments, prior to ending master state operation of the first control unit, a verification sequence is executed in which the first power source is controlled by the first control unit to de-energize the first power line, and the first control unit verifies the de-energized state of the first power line. In some embodiments, the first control unit verifies the de-energized state of the first power line through an input of the first control unit.

In some embodiments, the verification sequence includes additional operations. In some embodiments, the verification sequence is a method of verifying operation of a system for seamless switchover of safety control such as method 700 described below with respect to FIG. 7.

Another example embodiment of seamlessly switching control is method 500 depicted in FIG. 5. Various embodiments include some or all of the operations depicted in FIG. 5. In some embodiments, method 500 is implemented using system 100, described above with respect to FIGS. 1-3C.

In operation 510, a first input to a safety device is energized through a first power line, the safety device configured to actuate a safety apparatus in response to the first input being at a de-energized state for a first time interval.

In operation 520, the first power line is energized by a first power source through a second switch and a third switch, the first power source being controlled by a first control unit operating in a slave state.

In operation 530, operation of the first control unit is switched from slave state to a master state.

In operation 540, in response to beginning master state operation of the first control unit, the third switch and the second switch are opened, and the first power line is energized by closing a first switch electrically coupled to the first power source and to the first power line. Opening the third switch and the second switch, and closing the first switch are completed within the first time interval.

In operation 550, in some embodiments, a second power source is being controlled by a second control unit operating in slave state, and a fourth switch between the second power source and the first power line is opened in response to beginning master state operation of the first control unit.

The present description also concerns methods of verifying operation of a system for seamless switchover of safety control. An example embodiment of a method 700 of verifying operation of a system for seamless switchover of safety control is depicted in FIG. 7. Various embodiments include some or all of the operations depicted in FIG. 7. In some embodiments, method 700 is implemented using system 100, described above with respect to FIGS. 1-3C.

In operation 710, a first power source is controlled by a first control unit in master state to de-energize a first power line. In some embodiments, a second power source is also controlled by the first control unit to de-energize a second power line. In some embodiments, an active control line remains energized while the first and, if present, second power lines are de-energized.

In operation 720, the first control unit verifies the de-energized state of the first power line. In some embodiments, the first control unit verifies the de-energized state of the first power line through an input of the first control unit. In some embodiments, the first control unit also verifies the de-energized state of the second power line through the same or another input of the first control unit. In some embodiments, the first control unit verifies the de-energized state of the first power line by verifying that a voltage level of the first power line is below a predetermined voltage level.

In operation 730, in some embodiments, a second control unit verifies the de-energized state of the first power line. In some embodiments, the second control unit verifies the de-energized state of the first power line through an input of the second control unit. In some embodiments, the second control unit verifies the de-energized state of the first power line by verifying that a voltage level of the first power line is below a predetermined voltage level.

In some embodiments, the second control unit also verifies the de-energized state of the second power line through the same or another input of the second control unit. In some embodiments, the second control unit verifies the de-energized state of the second power line by verifying that a voltage level of the second power line is below a predetermined voltage level.

In some embodiments, the second control unit verifies the energized state of the active control line. In some embodiments, the second control unit verifies the energized state of the active control line by verifying that a voltage level of the active control line is above a predetermined voltage level.

In some embodiments, verification of the various energized and de-energized states by the second control unit is initiated by the first control unit.

In operation 740, in some embodiments, an active control line is de-energized by the first control unit.

In operation 750, in some embodiments, the first control unit verifies the de-energized state of the active control line. In some embodiments, the first control unit verifies the de-energized state of the active control line through an input of the first control unit.

In operation 760, in some embodiments, after the de-energizing of the active control line, the second control unit verifies active control line operation. In some embodiments, the second control unit verifies active control line operation by verifying energized and/or de-energized states of the active control line through an input of the second control unit. In some embodiments, the second control unit verifying active control line operation includes de-energizing and energizing a second power source controlled by the second control unit.

In operation 770, in some embodiments, the active control line is energized by the first control unit. In some embodiments, the active control line is energized by the first control unit while the second control unit is verifying active control line operation as described with respect to operation 760. In some embodiments, the first control unit verifies the energized state of the active control line. In some embodiments, the first control unit verifies the energized state of the active control line by verifying that a voltage level of the active control line is above a predetermined voltage level.

In operation 780, in some embodiments, the first power source is controlled by the first control unit (in master state) to energize the first power line. In some embodiments, the second power source is also controlled by the first control unit to energize the second power line. In some embodiments, the first control unit verifies the energized state of the first power line. In some embodiments, the first control unit verifies the energized state of the first power line by verifying that a voltage level of the first power line is above a predetermined voltage level.

In some embodiments, the first control unit also verifies the energized state of the second power line. In some embodiments, the first control unit verifies the energized state of the second power line by verifying that a voltage level of the second power line is above a predetermined voltage level.

FIG. 6 is a block diagram of a controller 600 configured for control of a safety device in accordance with one or more embodiments. In some embodiments, controller 600 is an on-board controller for a vehicle. In some embodiments, controller 600 is similar to control unit 185 (FIG. 2). Controller 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with elements of controller 600. The processor 602 is electrically coupled to the computer readable storage medium 604 via a bus 608. The processor 602 is also electrically coupled to an I/O interface 610 by bus 408. A network interface 612 is also electrically connected to the processor 602 via bus 608. Network interface 612 is connected to a network 614, so that processor 602 and computer readable storage medium 604 are capable of connecting and communicating to external elements via network 614. In some embodiments, network interface 612 is replaced with a different communication path such as optical communication, microwave communication, inductive loop communication, or other suitable communication paths. The processor 602 is configured to execute the computer program code 606 encoded in the computer readable storage medium 604 in order to cause controller 600 to be usable for performing a portion or all of the operations as described with respect to seamless switchover system 100 (FIG. 1) or methods 400 (FIG. 4), 500 (FIG. 5), and 700 (FIG. 7).

In some embodiments, the processor 602 is a central processing unit (CPU), a multi-processor, a distributed processing system, an application specific integrated circuit (ASIC), and/or a suitable processing unit. In some embodiments, processor 602 is configured to receive master/slave information signals via network interface 612. In some embodiments, processor 602 is configured to generate master/slave control information signals for transmitting to external circuitry via network interface 612.

In some embodiments, the computer readable storage medium 604 is an electronic, magnetic, optical, electromagnetic, infrared, and/or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 604 includes a compact disk-read only memory (CD-ROM), a compact disk-read/write (CD-R/W), and/or a digital video disc (DVD). In some embodiments, the computer readable storage medium 604 is part of an embedded microcontroller or a system on chip (SoC).

In some embodiments, the storage medium 604 stores the computer program code 606 configured to cause controller 600 to perform some or all of the operations as described with respect to seamless switchover system 100 (FIG. 1) or methods 400 (FIG. 4), 500 (FIG. 5), and 700 (FIG. 7). In some embodiments, the storage medium 504 also stores information needed for performing the operations as described with respect to seamless switchover system 100, such as test algorithms 618, and/or a set of executable instructions to perform some or all of the operations as described with respect to seamless switchover system 100.

Controller 600 includes I/O interface 610. I/O interface 610 is coupled to external circuitry. In some embodiments, I/O interface 610 is configured to receive instructions from a port in an embedded controller. In some embodiments, I/O interface 610 includes one or more inputs configured to allow verification of the status of one or more system elements as described with respect to seamless switchover system 100.

Controller 600 also includes network interface 612 coupled to the processor 602. Network interface 612 allows Controller 600 to communicate with network 614, to which one or more other computer systems are connected. Network interface 612 includes wireless network interfaces such as BLUETOOTH, WIFI, WIMAX, GPRS, or WCDMA; or wired network interface such as ETHERNET, USB, IEEE-1394, or asynchronous or synchronous communications links, such as RS485, CAN or HDLC. In some embodiments, the operations as described with respect to Controller 600 are implemented in two or more seamless switchover systems, and information such as master/slave information is exchanged between different Controller 600 via network 614.

Controller 600 is configured to receive information related to test algorithms from a user or an external circuit. The information is transferred to processor 602 via bus 608 and stored in computer readable medium 604 as test algorithm parameter 618.

During operation, processor 602 executes a set of instructions to seamlessly switch safety control as described with respect to seamless switchover system 100 (FIG. 1) or methods 400 (FIG. 4), 500 (FIG. 5), and 700 (FIG. 7).

Although the embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and operations described in the specification. As one of ordinary skill in the art will readily appreciate from the disclosure of the present invention, processes, machines, manufacture, compositions of matter, means, methods, or operations, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or operations.

What is claimed is:

1. A system for seamless switchover, the system comprising:
    a first power line;
    a safety device comprising:
        a first input electrically coupled to the first power line; and
        a safety apparatus, the safety device configured to actuate the safety apparatus in response to the first input being at a de-energized state for a first time interval; and
    a plurality of subsystems, each subsystem comprising:
        a control unit configured to be switchable between a master state and a slave state;
        a first power source capable of energizing the first power line, the first power source configured to be controlled by the control unit;
        a first switch electrically coupled to the first power source and to the first power line, the first switch configured to be closed while the control unit is in the master state;
        a second switch electrically coupled to the first power source, the second switch configured to be closed while the control unit is in the slave state; and
        a third switch electrically coupled to the second switch and to the first power line, the third switch configured to be open only while the control unit of any subsystem of the plurality of subsystems is in the master state,
    the system configured to, within the first time interval, open or close the first switch, the second switch, or the third switch responsive to a transition of a control unit to or from the master state.

2. The system of claim 1, wherein the safety device is an emergency braking system and the safety apparatus is an emergency brake.

3. The system of claim 1, wherein the first input is an input to a relay.

4. The system of claim 1, further comprising an active control line,
    wherein the system is further configured so that a control unit in the master state energizes the control line, and wherein each subsystem of the plurality of subsystems further comprises a switch control configured to actuate the third switch in response to the control line being energized.

5. The system of claim 1, wherein the control unit of each subsystem of the plurality of subsystems is a vital on-board controller of a train.

6. The system of claim 1, wherein each subsystem of the plurality of subsystems further comprises a vital supervision card configured to control output of power from the first power source based on a monitored output of the control unit.

7. The system of claim 1, wherein the first switch and the second switch of each subsystem of the plurality of subsystems are contacts of a relay configured with an exclusive-or logic so that one contact is always closed when the other contact is open.

8. The system of claim 1, further comprising a second power line, wherein:
    the safety device further comprises a second input electrically coupled to the second power line, and the safety device is further configured to actuate the safety apparatus in response to the second input being at the de-energized state for the first time interval, and
    each subsystem of the plurality of subsystems further comprises:
        a second power source capable of energizing the second power line, the second power source configured to be controlled by the control unit;
        a fourth switch electrically coupled to the second power source and to the second power line, the fourth switch configured to be closed while the control unit is in the master state;
        a fifth switch electrically coupled to the second power source, the fifth switch configured to be closed while the control unit is in the slave state; and
        a sixth switch electrically coupled to the fifth switch and to the second power line, the sixth switch configured to be open only while the control unit of any subsystem of the plurality of subsystems is in the master state, the system further configured to, within the first time interval, open or close the fourth switch, the fifth switch, or the sixth switch responsive to a transition of a control unit to or from the master state.

9. The system of claim 8, wherein the first input and the second input are inputs to a relay and the first power source has a polarity opposite a polarity of the second power source.

10. The system of claim 1, wherein the system is further configured so that a maximum of one control unit of a subsystem of the plurality of subsystems is in the master state at any given time.

11. A system for seamless switchover, the system comprising:
    a first power line;
    a safety device comprising:
        a first input electrically coupled to the first power line; and
        a safety apparatus, the safety device configured to actuate the safety apparatus in response to the first input being at a de-energized state for a first time interval; and
    a first subsystem and a second subsystem, each of the first and second subsystems comprising:
        a control unit configured to be switchable between a master state and a slave state;

a first power source communicably coupled with the control unit and configured to energize the first power line, the first power source configured to be controlled by the control unit;

a first switch electrically coupled to the first power source and to the first power line, the first switch configured to be closed during a second time interval during which the control unit is in the master state;

a second switch electrically coupled to the first power source, the second switch configured to be closed during a third time interval during which the control unit is in the slave state; and a third switch electrically coupled to the second switch and to the first power line, the third switch configured to be open only while the control unit of the first subsystem or the control unit of the second subsystem is in the master state; and the system configured to, within the first time interval, open or close the first switch, the second switch, or the third switch responsive to a transition of the control unit between the master state and the slave state.

12. The system of claim 11, wherein the safety device is an emergency braking system and the safety apparatus is an emergency brake.

13. The system of claim 11, wherein the first input is an input to a relay.

14. The system of claim 11, further comprising an active control line,
wherein the system is further configured so that a control unit of either the first or second subsystem in the master state energizes the control line, and
wherein the first and second subsystems each further comprise a switch control configured to actuate the third switch in response to the control line being energized.

15. The system of claim 11, wherein the control unit is a vital on-board controller of a train.

16. The system of claim 11, wherein the first and second subsystems each further comprise a vital supervision card configured to control output of power from the first power source based on a monitored output of the control unit.

17. The system of claim 11, wherein the first switch and the second switch of the first and second subsystems are contacts of a relay configured with an exclusive-or logic so that one contact is always closed when the other contact is open.

18. The system of claim 11, further comprising a second power line, wherein:
the safety device further comprises a second input electrically coupled to the second power line, and the safety device is further configured to actuate the safety apparatus in response to the second input being at the de-energized state for the first time interval, and
the first and second subsystems each further comprise:
a second power source capable of energizing the second power line, the second power source configured to be controlled by the control unit;
a fourth switch electrically coupled to the second power source and to the second power line, the fourth switch configured to be closed while the control unit is in the master state;
a fifth switch electrically coupled to the second power source, the fifth switch configured to be closed while the control unit is in the slave state; and
a sixth switch electrically coupled to the fifth switch and to the second power line, the sixth switch configured to be open only while the control unit of either the first or second subsystem is in the master state, the system further configured to, within the first time interval, open or close the fourth switch, the fifth switch, or the sixth switch responsive to a transition of a control unit of either the first or second subsystem between the master state and the slave state.

19. The system of claim 18, wherein the first input and the second input are inputs to a relay and the first power source has a polarity opposite a polarity of the second power source.

20. The system of claim 11, wherein the system is further configured so that a maximum of one control unit of the first or second subsystem is in the master state at any given time.

* * * * *